Feb. 2, 1954
L. PASTEUR
2,668,082
ATOMIZING APPARATUS, PARTICULARLY
FOR ARBORICULTURE AND AGRICULTURE
Filed July 14, 1949
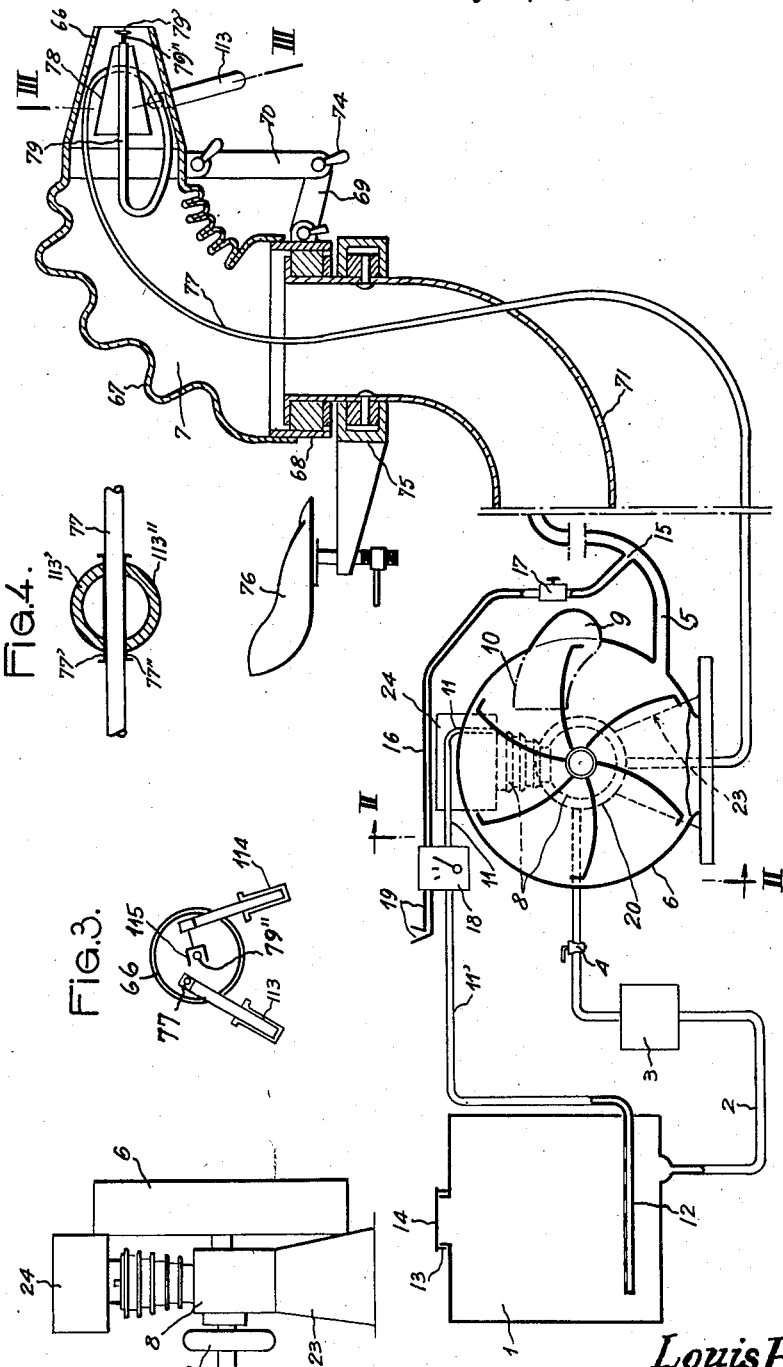
INVENTOR
Louis Pasteur,
BY
ATTORNEY Patented Feb. 2, 1954

2,668,082

UNITED STATES PATENT OFFICE 2,668,082

ATOMIZING APPARATUS, PARTICULARLY FOR ARBORICULTURE AND AGRICULTURE

Louis Pasteur, Versailles, France

Application July 14, 1949, Serial No. 104,633

Claims priority, application France November 16, 1948

6 Claims. (Cl. 299—86)

The object of the present invention is an atomizing apparatus, particularly for arboriculture and agriculture. Apparatus of this type, in use at present, do not allow the projection of a fine spray of insect destroying liquids to a sufficient height to treat relatively high fruit trees from the ground.

The apparatus according to the invention is designed in such a manner that a spray of insect destroying liquid or powder is formed inside the apparatus itself, before being projected, and is then expelled from said apparatus by an air stream of such a force that this spray can be projected to the height necessary for treating fruit trees. The production of the spray before its release from the aparatus ensures, further, that no liquid droplet is projected directly on to parts of the trees located at a small height, which is known to be detrimental due to the violent impact occurring in such a case on the leaves or small twigs of the trees.

According to the invention, the apparatus comprises a source of insect destroying solution, connected at the outlet of a centrifugal high pressure ventilator, motor driven, the stream of air forced out from the ventilator causing a suction effect on the solution, which is projected by means of a duct terminating into one or more nozzles, on to the plants to be protected, in such a manner that the spray of insect destroying product can reach the necessary height for the treatment of all fruit trees.

According to a preferred type of embodiment, there are assembled, on a wheel train or a vehicle, a tank and/or a pump, the centrifugal ventilator and its engine driving it directly, a duct connecting the tank with the outlet duct of the ventilator, a filter and a stop-cock in said duct, a shunt on the outlet of the ventilator, going to a diffusion element projecting part of the compressed air on the engine to cool it, a piping, connecting the exhaust of the engine to a perforated pipe located in the base of the tank, a duct going from the outlet from the ventilator to one or more projection nozzles, a branch taken from said duct, which can be connected with the perforated pipe located in the base of the tank, and a control element, such as a three way cock, making it possible to send into the perforated pipe located in the tank, at will, either the exhaust gases from the engine, or compressed air, to cause the agitation of the solution contained therein.

According to another characteristic, the nozzle is mounted so as to be capable of orientation, by means of a flexible tube, on a bent tube attached to the vehicle and through which the air forced out by the ventilator arrives; then the solution brought by a pipe in said nozzle is led to a spray nozzle placed inside a diffusion element, a deflector being arranged at the end of said spray nozzle. The rigid bent tube, mounted on the vehicle, carries a collar supporting the operator's seat and, above, a second rotating collar to which the flexible hose connected with the nozzle is connected.

An embodiment of the apparatus according to the invention is shown, by way of example, in the appended drawing in which Figure 1 is a diagrammatic view, in sectional elevation, of an apparatus according to the invention, provided with a tank.

Figure 2 is a diagrammatic view in elevation, corresponding to line II—II of Figure 1, of an installation provided with a pump drawing water directly or in the tank.

Figure 3 is a sectional view, substantially along line III—III of Figure 1.

Figure 4 is a detail section.

According to Figure 1, the apparatus comprises essentially a tank 1, containing an insect-destroying solution, which is connected, through a duct 2, wherein are inserted a filter 3 and a cock 4, with the discharge duct 5 of a centrifugal high pressure ventilator or blower 6. Duct 5 leads to one or more projection nozzles 7.

The centrifugal ventilator 6 is driven by an engine 8, preferably by direct gearing.

Part of the air forced back by the centrifugal ventilator 6 may be shunted at 9 from the ventilator housing, and directed by a diffusion element 10, on the motor 8 to ensure its cooling.

The exhaust of the engine 8 is connected through a piping 11 with a perforated pipe 12, located in the base of the tank 1, so that the solution contained in said tank can be agitated by the exhaust gases issuing from the holes of the pipe 12 and rising through said solution to escape at the upper part of the tank, at 13 for example, underneath its lid, 14.

The turbulence of the solution contained in tank 1 may also be ensured by compressed air derived at 15 from duct 5 and directed through a duct 16 connected with piping 11 to the perforated tube 12 located in the base of the tank. A cock 17 makes it possible to stop the piping 16.

Further, a three way cock 18 makes it possible, according to its setting, to place in communication ducts 11 and 11' to connect the exhaust of engine 8 with the perforated tube 12 or to stop this connection and to connect duct 11 with the exhaust to the atmosphere at 19 and to connect duct 16 with duct 11' to send compressed air derived at 15 into the perforated tube 12.

It is obvious that instead of a three way cock, 18, several stoppers could be provided, fulfilling separately the various above described functions.

The solution, preferably put in agitation in tank 1, either by the exhaust gases of the engine or by compressed air issuing from the holes of pipe 12, is led through the pipe 2 and filter 3, which stop the undesirable large particles.

A lift and force pump 20 sucks in water from tank 1 and forces it towards the projection duct 5. The engine 8, mounted on the base 23 and provided with the fuel tank 24 is inserted between the pump 20 and the ventilator 6; it thus ensures simultaneously the driving of these two pieces of apparatus. Two clutch mechanisms may be inserted between the pump and the engine on one hand and between this engine and the ventilator on the other hand, to allow of using these pieces of apparatus separately if desired. These clutches are not indispensable and it will be seen that in the example shown the assembly engine-pump-ventilator constitutes a compact unit of small bulk on one shaft.

The apparatus shown schematically is preferably mounted on a wheel train allowing its easy displacement on the ground. It may also be constituted by a fixed block capable of being mounted on a tractor or other agricultural vehicle. The utilization of the high pressure centrifugal ventilator constituted by a paddle wheel mounted in a housing of small width makes it possible to place said ventilator and its driving engine directly against the tank 1, thus obtaining a block offering a small bulk. This particular centrifugal ventilator generates an air stream under a very high pressure, which makes it possible to project the spray of atomized solution or the powder to a very great height. Thus all fruit trees can be treated, from the ground up. The apparatus can also be used for powder projection.

The projection of exhaust gas or compressed air in the tank for producing the turbulence may be continuous or intermittent.

The stopper 4, controlling the distribution of the solution to the projection duct 5, is conveniently controlled by means of a pedal, which is easier for the operator whose hands are occupied with the projection nozzle.

A nozzle 66 is mounted on a flexible hose 67, preferably a rubber hose, attached to a supporting collar 68. Articulated connecting rods, 69, 70, the articulations of which may be blocked by means of screws and nuts, constitute a knuckle joint for supporting the nozzle 66 on collar 68.

This collar 68 is itself mounted on the end of a bent tube 71, serving as a pivot, and connected to the discharge duct 5 through which the air arrives, forced by the blower 6, attached to the chassis of the vehicle.

74 designates the levers associated with the nuts for locking the screws, allowing the articulating to the knuckle joint 69—70.

A collar 75, attached on tube 71, carries a seat 76 on which the operator sits.

The liquid solution arrives from the pump 20 through the hose 77 which goes around a diffusion element 78 to reach a spray nozzle 79 opening in front of this diffusion element and at the front part of which a deflector 79' is located.

According to Figure 3, 113 designates an adjusting lever for the section of the hose 77. As shown on Figure 4, two contoured plates 77', 77", surrounding said hose 77 and the end of lever 113, constitute two jaws 113' and 113" which act on plates 77', 77", when said lever is rotated by causing them to throttle more or less the flexible hose 77 to regulate its section. 114 is a control lever for the forks 115 acting on the stem 79" of the deflector 79', to bring the latter closer to or farther away from the outlet of the delivery tube 79.

This mounting of the nozzle 66 on the atomizing apparatus makes it possible for the operator sitting on the seat 76 to direct said nozzle at will, then to adjust by means of lever 113 the section for the flow of solution and, by means of lever 114 the action of the deflector, ensuring a particularly rational operation.

What I claim is:

1. Atomizing apparatus particularly for arboriculture and agriculture comprising a pump, a centrifugal blower, an internal combustion engine including a shaft common to said pump and said blower for driving said pump and blower, a tank for containing an insect destroying product, a connection between said tank and the inlet of said pump, a mixing device in said tank and connected to said engine, a duct connected to the outlet of said centrifugal blower, a duct connected to the outlet of the pump and leading to the duct connected to the centrifugal blower, and an adjustable spraying nozzle connected to the end of the duct connected to the centrifugal blower.

2. Atomizing apparatus particularly for arboriculture and agriculture comprising a pump, a centrifugal blower, an internal combustion engine including a shaft common to said pump and said blower for driving said pump and blower, a tank for containing an insect destroying product, a connection between said tank and the inlet of said pump, a perforated tube in said tank, a piping connected to the exhaust of the internal combustion engine and leading to the perforated tube, a duct connected to the outlet of said centrifugal blower, a duct connected to the outlet of the pump and leading to the duct connected to the centrifugal blower, and an adjustable spraying nozzle connected to the end of the duct connected to the centrifugal blower.

3. Atomizing apparatus particularly for arboriculture and agriculture comprising a pump, a centrifugal blower, an internal combustion engine including a shaft common to said pump and said blower for driving said pump and blower, a tank for containing an insect destroying product, a connection between said tank and the inlet of said pump, a mixing device in said tank and connected to said engine, a duct connected to the outlet of said centrifugal blower, a duct connected to the outlet of the pump and leading to the duct connected to the centrifugal blower, a rigid tubular bend at the end of said latter duct, an orientable nozzle on said bend for receiving the insect destroying product through said latter duct, a diffusion element mounted in said nozzle, a spray nozzle inside said diffusion element, and an adjustable deflector located at the end of the nozzle.

4. Atomizing apparatus particularly for arboriculture and agriculture in accordance with claim 3, comprising a collar on the rigid bend and a seat mounted on said collar, and a second collar rotatable on the end of the bend and above the first mentioned collar, and a flexible hose connecting said second collar with the nozzle.

5. Atomizing apparatus particularly for arboriculture and agriculture in accordance with claim 3, comprising a collar on the rigid bend and a seat mounted on said collar, and a second collar rotatable on the end of said bend and above the first mentioned collar, and a flexible hose connecting said second collar with the nozzle, a knuckle joint interposed between said second collar and the nozzle, and a blocking device for said knuckle joint in the set position.

6. Atomizing apparatus particularly for arboriculture and agriculture in accordance with claim 3, comprising a collar on a rigid bend and a seat mounted on said collar, and a second collar rotatable on the end of said bend and above the first mentioned collar, a flexible hose connecting said second collar with the nozzle, a knuckle joint interposed between said second collar and the nozzle, a blocking device for said knuckle joint in the set position, a control lever on the nozzle and including two jaws throttling the flexible hose, and a second control-lever on the nozzle for controlling the spacing of the deflector from the outlet of the duct connected to the outlet of the delivery tube.

LOUIS PASTEUR.

References Cited in the file of this patent

UNITED STATES PATENTS

| Number | Name | Date |
|---|---|---|
| 575,375 | Reilly | Jan. 19, 1897 |
| 866,654 | Jakob | Sept. 24, 1907 |
| 998,762 | Faller | July 25, 1911 |
| 1,039,365 | Coutler | Sept. 24, 1912 |
| 1,194,358 | Cecil et al. | Aug. 15, 1916 |
| 1,473,786 | Gore | Nov. 13, 1923 |
| 1,687,545 | Clements | Oct. 16, 1928 |
| 1,785,932 | Brown et al. | Dec. 23, 1930 |
| 1,859,567 | Knapp et al. | May 24, 1932 |
| 2,220,082 | Daugherty | Nov. 5, 1940 |
| 2,224,741 | Metrick et al. | Dec. 10, 1940 |
| 2,275,302 | Magnuson | Mar. 3, 1942 |
| 2,429,374 | Shade | Oct. 21, 1947 |

FOREIGN PATENTS

| Number | Country | Date |
|---|---|---|
| 2,097 | Italy | Dec. 17, 1889 |
| 19,165 | Great Britain | of 1890 |
| 601,257 | France | Nov. 26, 1925 |